H. H. FEFELL.
SEWING MACHINE.
APPLICATION FILED MAY 3, 1912.

1,056,522.

Patented Mar. 18, 1913.
5 SHEETS—SHEET 1.

WITNESSES

INVENTOR
Henry H. Fefell
BY
ATTORNEY

UNITED STATES PATENT OFFICE.

HENRY H. FEFELL, OF PHILADELPHIA, PENNSYLVANIA, ASSIGNOR TO MONE R. ISAACS, OF PHILADELPHIA, PENNSYLVANIA.

SEWING-MACHINE.

1,056,522.  Specification of Letters Patent.  Patented Mar. 18, 1913.

Application filed May 3, 1912. Serial No. 694,921.

*To all whom it may concern:*

Be it known that I, HENRY H. FEFELL, a citizen of the United States, residing at Philadelphia, in the county of Philadelphia and State of Pennsylvania, have invented certain new and useful Improvements in Sewing-Machines, of which the following is a specification.

This invention relates to sewing machines wherein a sewing needle and a looper are operated in conjunction with each other to sew the edge portion of a piece of fabric to the body thereof in producing a hem, the needle passing only part way through the body of the fabric to which the edge is sewed so that the stitches will not appear on the outside of the fabric.

The object of my invention is to provide, in a machine of this character, a novel, simple and efficient means for supporting and actuating the needle and the looper, and particularly actuating the needle in a manner to cause it to move back and forth laterally in the direction of the line of stitches to assist in feeding the fabric during the sewing operation.

A further object of my invention is to provide in conjunction with the needle and looper actuating means a main presser-foot and a feeding presser-foot and operating means therefor, the main presser-foot holding the fabric while the needle is penetrating the fabric and the feeding presser-foot assisting in the feeding of the fabric.

A further object of my invention is to provide a yielding support for the fabric to insure uniform action of the presser-feet upon the fabric; and a further object of my invention is to provide a machine which will not stretch the fold in the fabric during the sewing of the hem.

The invention consists in the novel construction and combinations of parts for accomplishing these objects, as will be hereinafter fully described and claimed.

Referring to the drawings, 7 designates the bed plate of the machine, 8 a standard rising from one end of the bed plate, and 9 a frame extending from the standard and overhanging the other end of the bed plate and providing a casing 10 in which parts of the mechanism are contained. The main driving shaft 11 of the machine extends horizontally through the overhanging frame 9 and is journaled in suitable bearings therein. One end of the driving shaft 11 extends outwardly from the frame and is provided with a suitable hand wheel 12 and driving pulleys 13 and 14.

During the sewing operation, the stitches are formed by a needle 15 and a coöperating looper 16; and I shall first describe the mechanism for actuating the needle 15 from the driving shaft 11 of the machine.

The driving shaft 11 extends into the casing 10 and is provided with a cam 17 for a purpose hereinafter explained. The cam 17 carries a roller 18 which extends from the outer face of the cam away from the center and parallel to the axis of the shaft 11. The roller 18 extends into a cam groove formed in a cam block 19 which is secured to a vertically-arranged, reciprocative bar 20. The reciprocations of the bar 20 are effected by the roller 18 operating against the cam block 19 during the rotation of the main shaft 11. Arranged adjacent the bar 20 and slidably engaged with one side thereof is another bar 21. The bars 20 and 21 are mounted in the top of the casing 10 in a manner to permit their lower ends to be oscillated laterally and at the same time permit the bars to be vertically-reciprocated independently of each other. The bars 20 and 21 extend through a slot in the bottom of the casing 10 to permit lateral oscillation of the bars.

The portions of the bars 20 and 21 within the lower portion of the casing 10 are held together between the free lower end of a flat spring 22 and a roller 23. The upper end of the spring 22 is secured to the outer face of one side of the casing 10, and the lower or free end of the spring operates to maintain the bars 20 and 21 in engagement with each other and the bar 20 in engagement with the roller 23. The roller 23 is carried by the lower end of a lever 24 which is fulcrumed in the casing 10 and is connected at its upper end to an arm or lever 25 which is provided with a roller 26 engaging the cam 17. The spring 22 maintains the roller 26 in engagement with the cam 17, and the arm 24 bears against a fixed obstruction between its ends forming a fulcrum therefor. It will thus be seen that when the main shaft 11 is rotated, the cam 17 will oscillate the levers 24 and 25 and thereby oscillate the lower ends of the bars 20 and 21.

The bar 20 is provided with a stud 27 which extends through a slot in the face plate 28 for the casing 10. The stud 27 carries a pin or screw 29 which projects into a slot in one end of a lever 30 which is fulcrumed, at 31, on the face plate 28. The other end of the lever 30 extends around to one side of the casing 10 and is connected to the upper end of an arm or link 32 by a ball-and-socket connection. The lower end of the link 32 is connected by a ball-and-socket connection to an arm 33 extending from and fixed to a horizontal rock shaft 34 which is mounted to turn in suitable bearings on the bottom of the face plate 28. The shaft 34 is mounted to reciprocate longitudinally as well as to turn in its bearings, and the shaft 34 is provided with fixed collars 35 and 36 between which the lower ends of the bars 20 and 21 extend. The collar 35 engages the bar 20 and the collar 36 engages the bar 21 so that when the bars 20 and 21 are oscillated, the shaft 34 will be longitudinally reciprocated. Secured to the shaft 34 is a downwardly-extending arm 37 carrying the sewing needle 15 which is curved and extends from the lower end thereof, as shown. During the rotation of the main shaft 11, the reciprocations of the bar 20 cause the lever 30 and link 32 to rock the shaft 34 and thereby reciprocate the needle 15 to cause it to penetrate the fabric being sewed, during the sewing operation which will be hereinafter described; and, during the reciprocations of the needle, it is moved laterally back and forth by the lower ends of the bars 20 and 21 engaging the collars 35 and 36 of the shaft 34 during the oscillation of the bars.

I shall now describe the mechanism for actuating the looper 16 from the main driving shaft 11 of the machine.

The main shaft 11 carries an eccentric 38 surrounded by a strap 39 on the upper end of an arm 40. The lower end of the arm 40 is connected to one end of a lever 41 which is fulcrumed at 42 on a bracket 43 on the casing 10. The other end of the lever 41 is connected by a ball-and-socket joint to the upper end of an arm or link 44. The lower end of the link 44 is connected by a ball-and-socket joint to an arm 45 which is fixed to and extends from a rock shaft 46 mounted to turn in a bracket 47 secured to one side of the casing 10. The inner end of the shaft 46 is provided with a projecting arm 47ª which carries the looper 16 which extends parallel to the axis of the shaft 46 and parallel to the path of stitches formed during the sewing operation. The looper 16 comprises a shank portion secured to and projecting from the arm 47ª, and having a bifurcated free end providing the pointed limbs 48 and 49, as shown, the limb 49 having a laterally extending projection or tooth 50 for a purpose hereinafter explained. The mounting of the shaft 46 and its connection to the driving shaft 11 is such that during the rotation of the driving shaft 11 the shaft 46 will be rocked to move the looper 16 from side to side of the line of sewing and also to raise and lower the looper on each side of the line of sewing. The shaft 46 is mounted to reciprocate longitudinally as well as to turn in the bracket 47; and the outer end of the shaft 46 is provided with a projecting arm 51 which is pivoted to one arm of a bell-crank lever 52, fulcrumed at 53 on the bracket 47. The other arm of the lever 52 is pivoted to the lower end of a link 54, the upper end of which is pivoted to the lever 30, hereinafter referred to, whereby during the operation of the machine, the operations of the levers 30 and 52 will reciprocate the shaft 46 and therewith the looper 16 in the direction of the line of sewing the slight extent required during the sewing operation hereinafter described.

Figure 1:
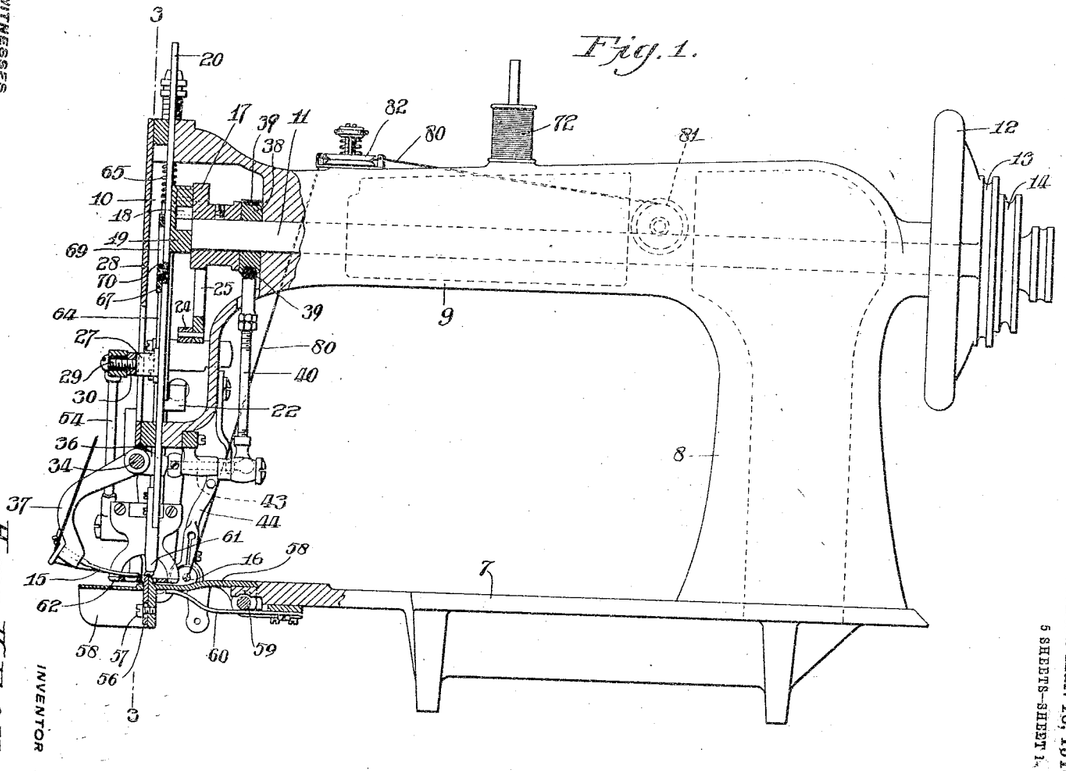
Figure 1, is a side elevation, partly in section, of a sewing machine embodying my invention.
Figure 2:
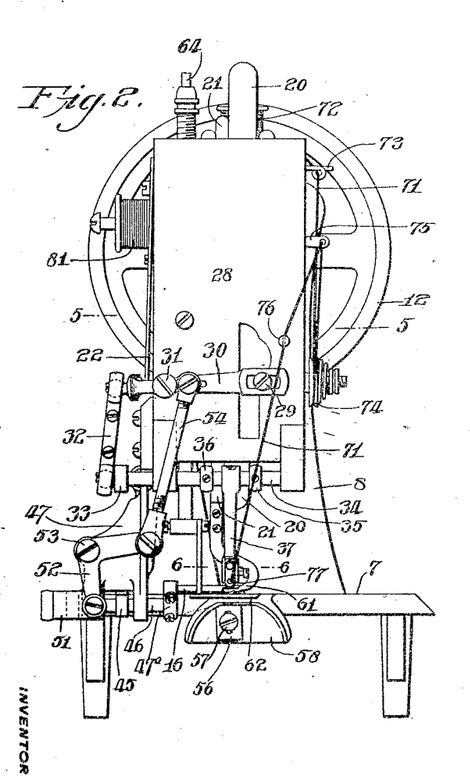
Fig. 2, is a front elevation of the machine.
Figure 3:
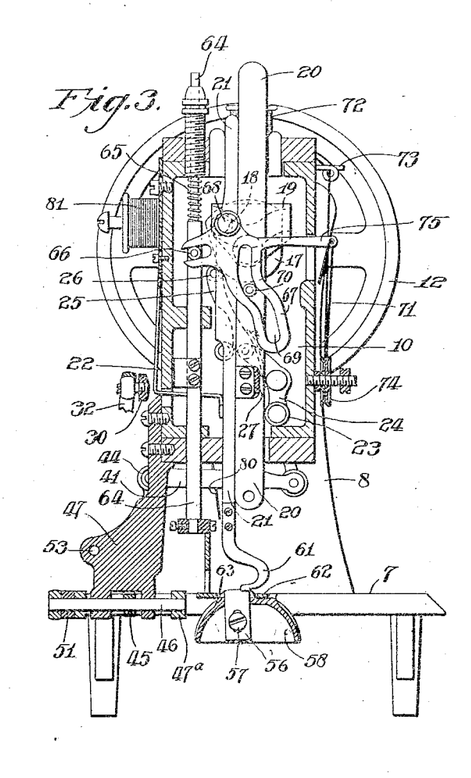
Fig. 3, is a vertical section, on line 3—3 of Fig. 1.
Figures 4, 5, 6, 7:
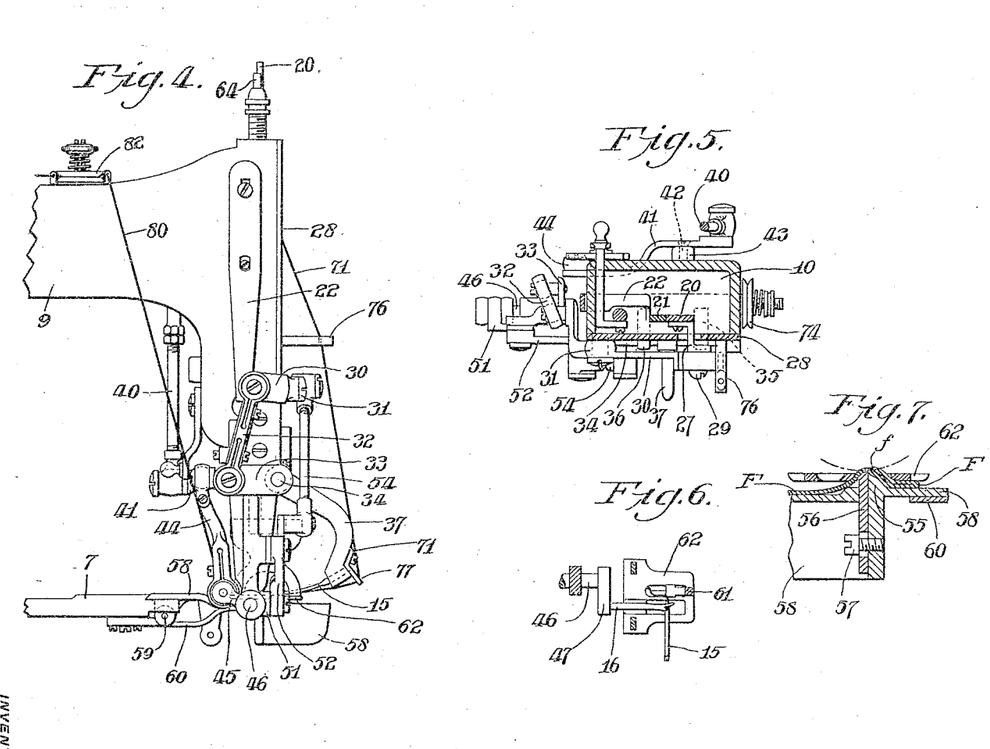
Fig. 4, is an elevation of the end of the machine provided with the sewing mechanism, as seen from the opposite side of the machine to that shown in Fig. 1.
Fig. 5, is a horizontal section, on line 5—5 of Fig. 2.
Fig. 6, is a horizontal section, on line 6—6 of Fig. 2.
Fig. 7, is an enlarged section, showing the guides for the fabric to be sewed and the fabric applied thereto.

The fabric F to be sewed is folded to form a hem, as shown in Fig. 7, and is fed over a rib 55 which is located directly beneath the path of the needle 15 and which extends parallel to the line of sewing. The rib 55 is formed on a curved plate or bracket 58 for supporting the material being sewed. This bracket is pivoted to the bed plate 7 at 59 and is held normally in the horizontal position by a flat spring 60, one end of which is secured to the bottom of the bed plate 7 and the other end of which bears against the bracket 58 in a manner to yieldingly support the bracket and permit it to be depressed against the action of the spring 60.

Adjacent the rib 55 and forming a lateral extension thereof is a vertically adjustable plate 56 held in place by a screw 57 passing through a slot in the plate 56 and screwed into the rib 55. The top of the plate 56 extends a slight distance above the top of the rib 55 to elevate that portion of the main body of the fabric F adjacent the edge $f$ thereof, so that the needle 15 may pass through the edge $f$ and the main body of the fabric during the formation of the stitches. The path of the needle 15 is indicated by a dot-and-dash line in Fig. 7.

The fabric passes beneath a feeding presser foot 61 located directly above the rib 55 and carried by the lower end of the vertically reciprocative bar 21. The presser foot 61 has a curved bottom to conform to the rib 55 and adjacent plate 56, as shown. The fabric also passes between the top of the bracket 58 and the main presser foot or plate 62 having an opening 63 therein to receive the rib 55 and plate 56 and the feeding presser foot 61. The wall of the opening 63 in the foot 62 is spaced from the rib 55 and the bottom of the foot 62 is below the top of the rib 55 and plate 56, so that the fabric will be pressed down on each side of the rib and plate and be caused to assume a rib-like form as it passes the needle 15.

The main presser foot or plate 62 is carried by the lower end of a vertically-arranged rod 64 which extends upwardly through and is guided in the casing 10 in a manner to permit the rod 64 and presser foot 62 to be vertically reciprocated. The presser foot 62 is pressed down by the action of a spring 65 encircling the upper reduced end of the rod 64. The rod 64 is provided with a roller 66 within the casing 10, and the roller 66 extends into a slot formed in a plate or arm 67 which is pivoted at 68, to the bar 21. This plate 67 is provided with a cam slot 69 into which extends a roller 70 carried by the bar 20, whereby when the bar 20 is reciprocated, the roller 70 will engage the walls of the cam slot 69 and rock the plate 67 on its pivot and thereby raise and lower the bar 21 and rod 64 and therewith the feeding presser foot 61 and main presser foot 62, respectively, during the operation of the machine, in a manner hereinafter explained.

The purpose of the main presser foot 62 is to hold the fabric against the bracket 58 while the needle is penetrating and being withdrawn from the fabric; and the purpose of the feeding presser foot 61 is to feed the fabric forwardly while the needle 15 is disengaged therefrom and the main presser foot 62 is raised.

The needle thread 71 passes from a spool 72 on the arm 9 to an eye 73 on the casing 10, thence down and through a tension device 74 on the casing 10, thence through an eye on a take-up arm 75 projecting from the plate 67, thence down through an eye on a stud 76 on the face plate 28, thence through an eye 77 on the needle arm 37 and from the eye 77 to the needle eye. During the sewing operation, the take-up arm 75 is operated by the plate 67 to take up the slack thread during the formation of the stitches.

The sewing mechanism hereinbefore described is adapted to produce single thread stitches by the needle thread 71 alone or to produce double thread stitches by the needle thread 71 and a looper thread, as will be hereinafter described.

Figure 8:
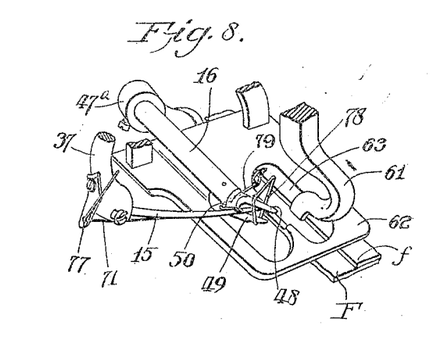
Figs. 8 to 12, inclusive, are perspective views of the needle and looper and adjuncts, showing different positions thereof during the formation of stitches by a needle thread.
Figure 9:
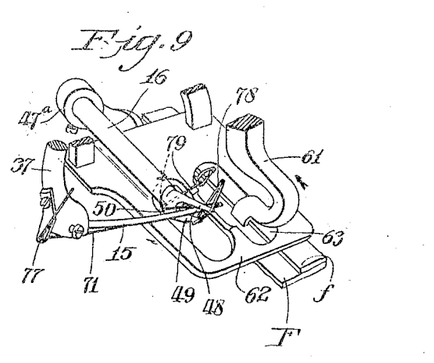
Figures 10, 11, 12, 13:
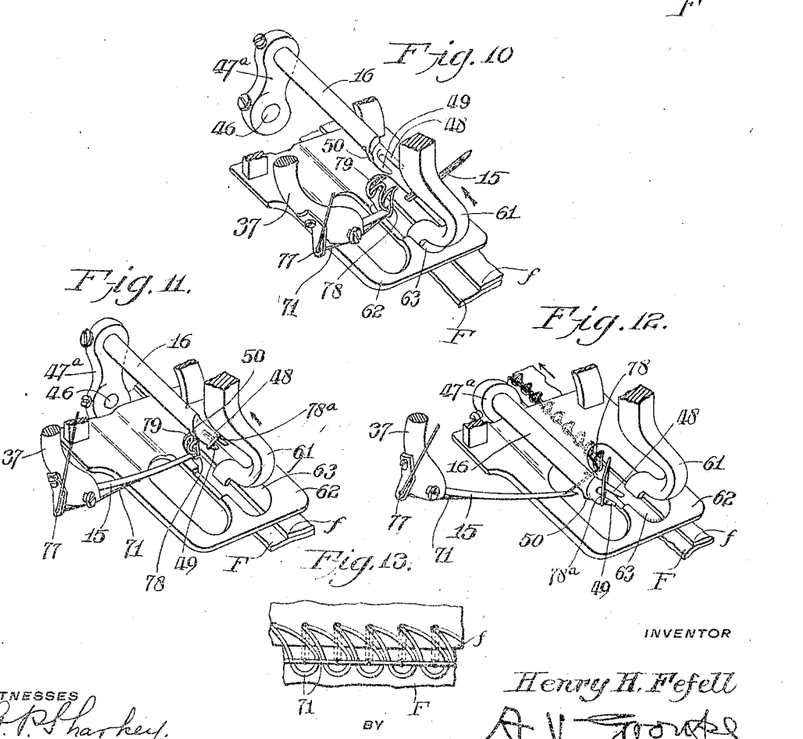
Fig. 13 is a view showing a piece of cloth and stitches formed by the needle thread.
Figure 14:
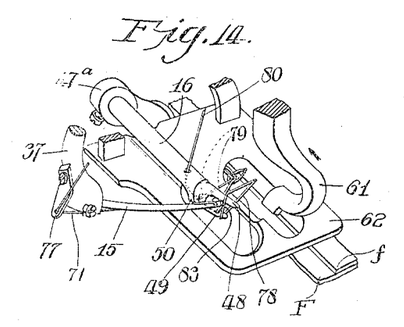
Figs. 14 to 18, inclusive, are perspective views of the needle and looper and adjuncts, showing different positions thereof during the formation of stitches by a needle thread and a looper thread.
Figure 15:
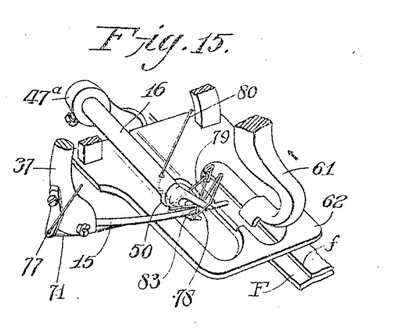
Figures 16, 17, 18, 19:
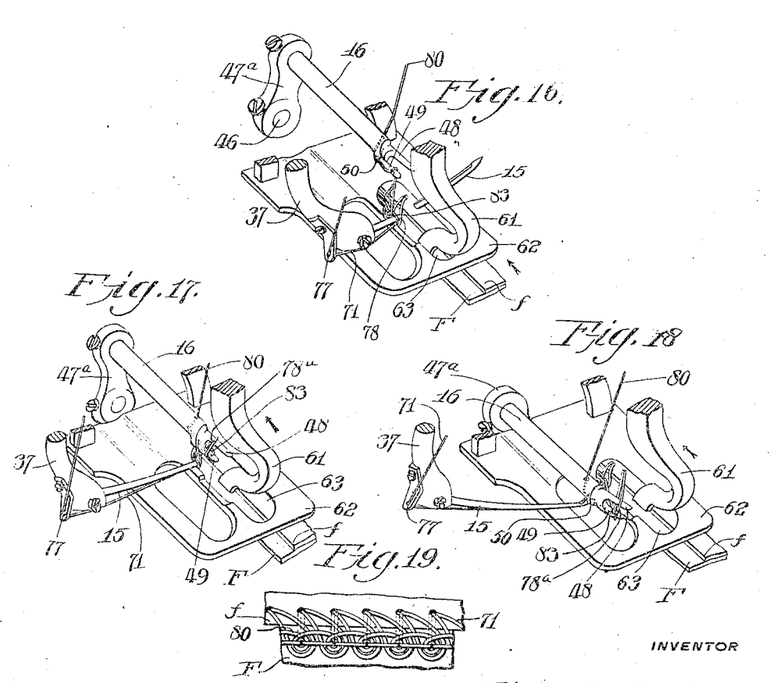
Fig. 19 is a view showing a piece of cloth and stitches formed by the needle thread and the looper thread.

I shall first describe the operation of producing the stitches by the needle thread alone, which operation is as follows: Starting with the parts in the positions shown in Figs. 1 to 8 of the drawings, in which the needle is in position to advance and penetrate the edge of the fabric and the body of the fabric to which the edge is to be sewed. In this position of the parts the thread 71 extending from the previously formed stitch extends around the limb 49 of the looper 16 back of the projection 50 thereon, and a loop of thread 78 extends from the previously formed stitch around both limbs 48 and 49 of the looper, as clearly shown in Fig. 8. As the needle advances to the position shown in Fig. 9, the needle passes through the loop 78 and into the fabric F being sewed and draws the needle thread feeding from the needle eye around the projection 50 and forms a loop 79 while the looper 16 recedes and casts off the loop 78. As the needle 15 continues its forward movement to the end of the stroke where it projects beyond the fabric F, shown in Fig. 10, the needle 15 draws up the loop 78 and the looper 16 casts off the loop 79, while the looper 16 moves about the axis of the shaft 46 to the position shown in Fig. 10. While the needle advances from the position shown in Fig. 10 to the position shown in Fig. 11, the main presser foot 62 is raised from and the feeding presser foot 61 is lowered into engagement with the fabric. After needle 15 completes its forward stroke, shown in Fig. 10 and while it moves back to the position shown in Fig. 11, the needle 15 and presser foot 61 are moved laterally in the direction of the arrow to feed the fabric forwardly a distance equal to the space between two adjacent stitches, while the looper moves in a reverse direction on the line of its axis and at the same time starts its reverse motion about the axis of the shaft 46, thereby causing its pointed limbs 48 and 49 to pass over and take a fresh loop of thread $78^a$ from the needle 15. As the parts move from the position shown in Fig. 11 to the position shown in Fig. 12, the feeding presser foot 61 is raised from the fabric and the main presser foot 62 is lowered into engagement with the fabric and the needle 15 and looper 16, draw up the loop 79 previously cast off from the projection 50. The needle 15 now starts forward from the position shown in Fig. 12 to the position shown in Fig. 8, passing between the limbs 48 and 49 of the looper 16 and into the thread loop 78ª and drawing a fresh thread loop around the limb 49 of the looper and the projection 50 thereon for a succeeding stitch forming operation. It will thus be seen that each time the needle penetrates the fabric and projects a loop of thread therethrough the fabric is advanced and the loop of thread is taken from the needle by the looper 16 and moved to the other side of the line of stitches and held in position to receive the needle when it is again advanced to penetrate the fabric thereby forming the chain of loops, as shown in Fig. 13, uniting the edge of the fabric with the body thereof and forming the hem.

During the sewing operation, the bracket 58 yields against the action of the spring 60 as the presser feet 61 and 62 force the fabric against the bracket, thus insuring, practically, a uniform pressure upon the fabric, irrespective of any variation in the thickness thereof.

The looper thread 80 passes from a spool 81 on one side of the arm 9 to and through a suitable tension device 82 on the arm 9, thence down through an eye in the shank of the looper 16 and thence up through an eye in the limb 49 of the looper to the stitches.

The operation of producing stitches by the needle thread 71 and the looper thread 80, combined, is illustrated in Figs. 14 to 18, inclusive, in which the positions of the parts of the sewing mechanism correspond with the positions of the parts illustrated in Figs. 8 to 12, inclusive, respectively. During this operation, stitches are formed by the needle thread 71 the same as when no looper thread 80 is present and as previously described. The looper thread 80 is, however, during this operation interlaced with the stitches as follows: Each time the needle advances through its own loop 78 held by the looper 16 and draws the needle thread around the looper limb 49 to form the loop 79, the needle is projected through a loop 83 of looper thread brought into the path of the needle by the looper limb 49, the loop 83 being formed by the looper thread extending from a previously formed stitch to the eye in the looper limb 49 and thence along the bottom of the looper to the eye in the shank thereof. It will thus be seen that the looper thread will be extended from stitch to stitch and be wrapped around each loop of needle thread projected through the fabric by the needle 15, as clearly shown in Fig. 19.

I claim:

1. In a sewing machine, the combination of a frame, a driving shaft, a bar, means operated by said shaft for reciprocating and for oscillating said bar, a rock shaft, means operated by said bar for rocking said rock shaft, means operated by said bar for longitudinally reciprocating said rock shaft, and an arm projecting from said rock shaft and provided with a sewing needle.

2. In a sewing machine, the combination of a frame, a driving shaft, a bar, means operated by said shaft for reciprocating and for oscillating said bar, a rock shaft, an arm extending from the rock shaft, a lever connected to said arm and said bar whereby the rock shaft is rocked when the bar is reciprocated, means operated by said bar for longitudinally reciprocating said rock shaft, and an arm projecting from said rock shaft and provided with a sewing needle.

3. In a sewing machine, the combination of a frame, a driving shaft, a bar, means operated by said shaft for reciprocating and for oscillating said bar, a rock shaft provided with fixed collars between which said bar extends, whereby the rock shaft is longitudinally reciprocated when the bar is oscillated, means operated by said bar for rocking said rock shaft, and an arm projecting from said rock shaft and provided with a sewing needle.

4. In a sewing machine, the combination of a frame, a driving shaft, a bar, means operated by said shaft for reciprocating and for oscillating said bar, a rock shaft provided with fixed collars between which said bar extends, whereby the rock shaft is longitudinally reciprocated when the bar is oscillated, an arm extending from the rock shaft, a lever connected to said arm and said bar whereby the rock shaft is rocked when the bar is reciprocated, and an arm projecting from said rock shaft and provided with a sewing needle.

5. In a sewing machine, the combination of a frame, a driving shaft, a bar, means operated by said shaft for reciprocating and for oscillating said bar, a rock shaft having its axis at right angles to the axis of the driving shaft, means operated by the driving shaft for rocking said rock shaft, means operated by said bar for longitudinally reciprocating said rock shaft, an arm projecting from said rock shaft and provided with a looper, a sewing needle, and means operated by said bar for actuating the needle.

6. In a sewing machine, the combination of a frame, a driving shaft, a bar, means operated by said shaft for reciprocating and for oscillating said bar, a rock shaft having its axis at right angles to the axis of the driving shaft, an arm extending from the rock shaft, a lever connected to said arm and operated by an eccentric on the main shaft to rock said rock shaft, means operated by said bar for longitudinally reciprocating said rock shaft, an arm projecting from said rock shaft and provided with a looper, a sewing needle, and means operated by said bar for actuating the needle.

7. In a sewing machine, the combination of a frame, a driving shaft, a bar, means operated by said shaft for reciprocating and for oscillating said bar, a rock shaft having its axis at right angles to the axis of the driving shaft, means operated by the driving shaft for rocking said rock shaft, a lever connected to said rock shaft and said bar, whereby the rock shaft is longitudinally reciprocated when the bar is reciprocated, an arm projecting from said rock shaft and provided with a looper, a sewing needle, and means operated by said bar for actuating the needle.

8. In a sewing machine, the combination of a frame, a driving shaft, a bar, means operated by said shaft for reciprocating and for oscillating said bar, a rock shaft having its axis at right angles to the axis of the driving shaft, an arm extending from the rock shaft, a lever connected to said arm and operated by an eccentric on the main shaft to rock said rock shaft, a lever connected to said rock shaft and said bar, whereby the rock shaft is longitudinally reciprocated when the bar is reciprocated, an arm projecting from said rock shaft and provided with a looper, a sewing needle, and means operated by said bar for actuating the needle.

9. In a sewing machine, the combination of a frame, a driving shaft, a bar, means operated by said shaft for reciprocating and for oscillating said bar, a rock shaft, means operated by said bar for longitudinally reciprocating said rock shaft, an arm projecting from said rock shaft and provided with a sewing needle, a second rock shaft, means operated by said bar for rocking the first named rock shaft and for longitudinally reciprocating the second named rock shaft, means operated by the driving shaft for rocking the second named rock shaft, and an arm projecting from the second named rock shaft and provided with a looper.

10. In a sewing machine, the combination of a frame, a driving shaft, a bar, means operated by said shaft for reciprocating and for oscillating said bar, a rock shaft, means operated by said bar for rocking said rock shaft, means operated by said bar for longitudinally reciprocating said rock shaft, an arm projecting from said rock shaft and provided with a sewing needle, a support for the fabric to be sewed, a fabric-feeding presser-foot above said support, and means operated by said bar for raising and lowering said presser-foot and for moving it back and forth.

11. In a sewing machine, the combination of a frame, a driving shaft, a bar, means operated by said shaft for reciprocating and for oscillating said bar, a rock shaft, means operated by said bar for rocking said rock shaft, means operated by said bar for longitudinally reciprocating said rock shaft, an arm projecting from said rock shaft and provided with a sewing needle, a support for the fabric to be sewed, a fabric-feeding presser-foot above said support, means operated by said bar for raising and lowering said presser-foot and for moving it back and forth, a main presser foot above said support, and means operated by said bar for raising and lowering said main presser-foot.

12. In a sewing machine, the combination of a frame, a driving shaft, a bar, means operated by said shaft for reciprocating and for oscillating said bar, a rock shaft, means operated by said bar for rocking said rock shaft, means operated by said bar for longitudinally reciprocating said rock shaft, an arm projecting from said rock shaft and provided with a sewing needle, a second rock shaft, means operated by said bar for longitudinally reciprocating the second named rock shaft, means operated by the driving shaft for rocking the second named rock shaft, an arm projecting from the second named rock shaft and provided with a looper, a support for the fabric to be sewed, a fabric-feeding presser-foot above said support, and means operated by said bar for raising and lowering said presser-foot and for moving it back and forth.

13. In a sewing machine, the combination of a frame, a driving shaft, a bar, means operated by said shaft for reciprocating and for oscillating said bar, a rock shaft, means operated by said bar for rocking said rock shaft, means operated by said bar for longitudinally reciprocating said rock shaft, an arm projecting from said rock shaft and provided with a sewing needle, a second rock shaft, means operated by said bar for longitudinally reciprocating the second named rock shaft, means operated by the driving shaft for rocking the second named rock shaft, an arm projecting from the second named rock shaft and provided with a looper, a support for the fabric to be sewed, a fabric-feeding presser-foot above said support, means operated by said bar for raising and lowering said presser-foot and for moving it back and forth, a main presser-foot above said support, and means operated by said bar for raising and lowering said main presser-foot.

14. In a sewing machine, the combination of a needle and a looper, means for supporting and actuating them to produce stitches and to move them laterally in the direction of the line of sewing and back again, a support for the fabric to be sewed, a fabric-feeding presser-foot above said support, and means for raising and lowering said presser-foot and for moving it back and forth in the direction of the line of sewing.

15. In a sewing machine, the combination of a needle and a looper, means for supporting and actuating them to produce stitches and to move them laterally in the direction of the line of sewing and back again, a yielding support for the fabric to be sewed, a fabric-feeding presser-foot above said support, and means for raising and lowering said presser-foot and for moving it back and forth in the direction of the line of sewing.

16. In a sewing machine, the combination of a needle and a looper, means for supporting and actuating them to produce stitches and to move them laterally in the direction of the line of sewing and back again, a fabric-supporting rib beneath the line of sewing, and means for pressing the fabric down on each side of said rib.

17. In a sewing machine, the combination of a needle and a looper, means for supporting and actuating them to produce stitches and to move them laterally in the direction of the line of sewing and back again, a fabric-supporting rib beneath the line of sewing, a vertically-adjustable fabric-supporting plate adjacent said rib and beneath the line of sewing, and means for pressing the fabric down on each side of said adjacent rib and plate.

In testimony whereof I affix my signature in presence of two witnesses.

HENRY H. FEFELL.

Witnesses:
S. I. HARPER,
A. V. GROUPE.